United States Patent
Johnson et al.

(10) Patent No.: US 9,634,458 B2
(45) Date of Patent: Apr. 25, 2017

(54) PUMP RECYCLING INTEGRATED AMPLIFIER

(71) Applicant: BAE Systems Information and Electronic Systems Integration Inc., Nashua, NH (US)

(72) Inventors: Benjamin R. Johnson, Nottingham, NH (US); Daniel J. Creeden, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 14/870,929

(22) Filed: Sep. 30, 2015

(65) Prior Publication Data

US 2016/0099538 A1    Apr. 7, 2016

Related U.S. Application Data

(60) Provisional application No. 62/058,826, filed on Oct. 2, 2014.

(51) Int. Cl.
| | | |
|---|---|---|
| *H01S 3/094* | (2006.01) | |
| *H01S 3/067* | (2006.01) | |
| *H01S 3/16* | (2006.01) | |

(52) U.S. Cl.
CPC .... *H01S 3/094003* (2013.01); *H01S 3/06754* (2013.01); *H01S 3/094015* (2013.01); *H01S 3/0675* (2013.01); *H01S 3/06758* (2013.01); *H01S 3/1616* (2013.01)

(58) Field of Classification Search
CPC ................ H01S 3/094003; H01S 3/06754
See application file for complete search history.

(56) References Cited

U.S. PATENT DOCUMENTS

| | | | | |
|---|---|---|---|---|
| 7,822,314 B1* | 10/2010 | Robin | ............... | G02B 6/02333 359/334 |
| 9,071,037 B2* | 6/2015 | Gu | ........................ | H01S 3/0057 |

* cited by examiner

*Primary Examiner* — Dung Nguyen
(74) *Attorney, Agent, or Firm* — Sand & Sebolt, LPA; Daniel J. Long

(57) ABSTRACT

A laser system and method of use are provided in which the laser system may include a fiber laser oscillator and rare earth doped piece of optical fiber which may absorb unused pump light which is unabsorbed in the oscillator.

9 Claims, 3 Drawing Sheets

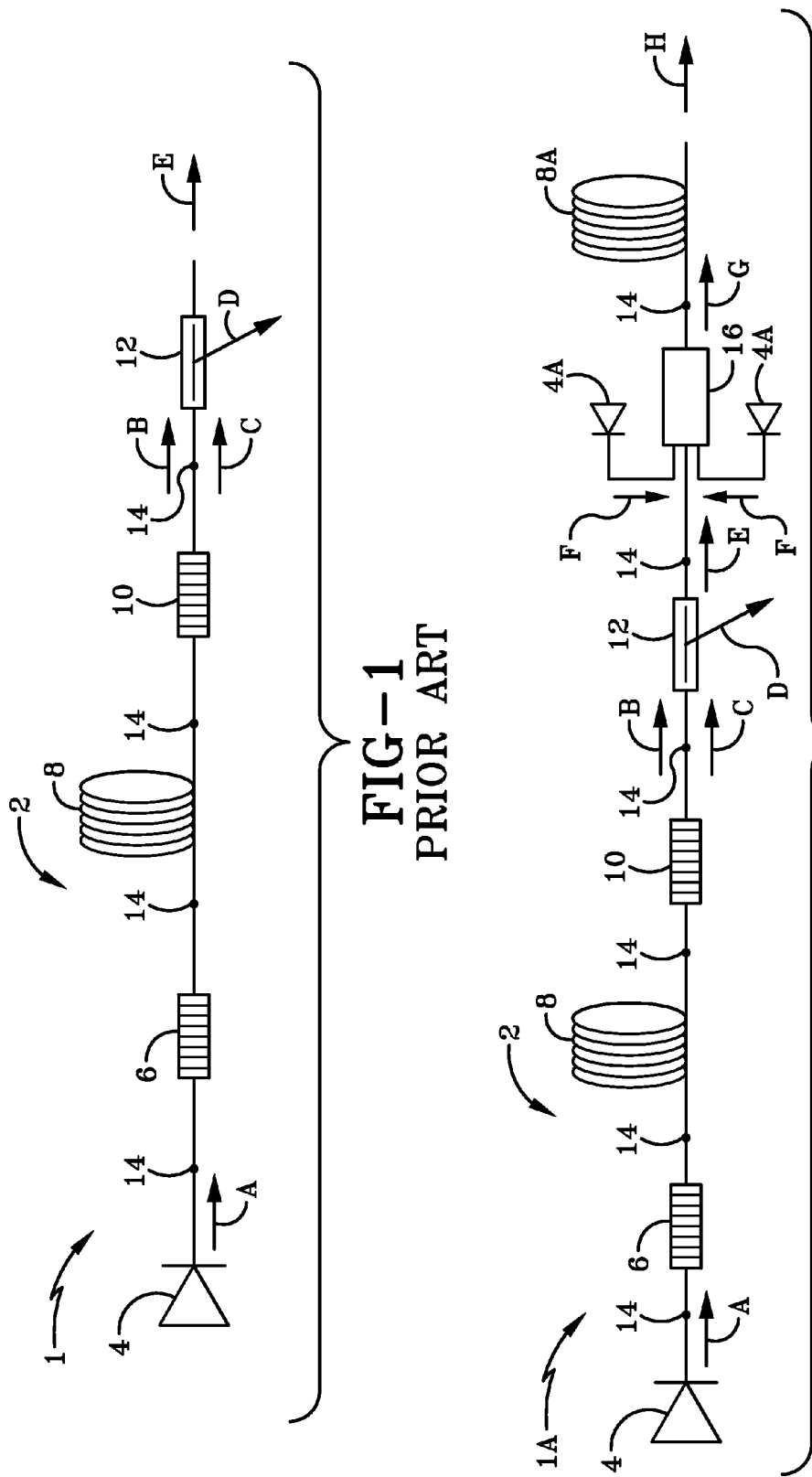

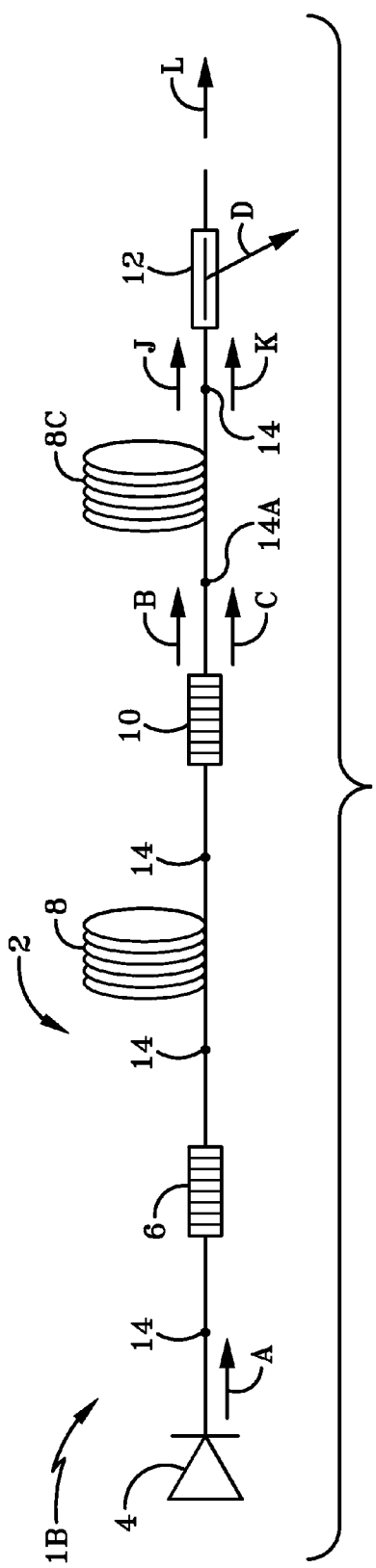

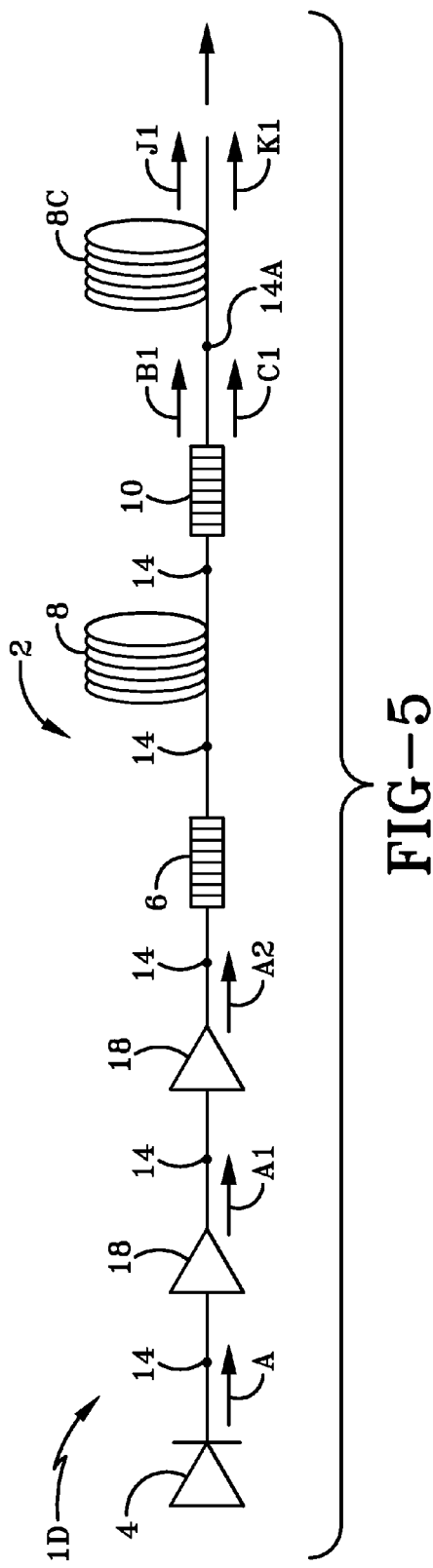
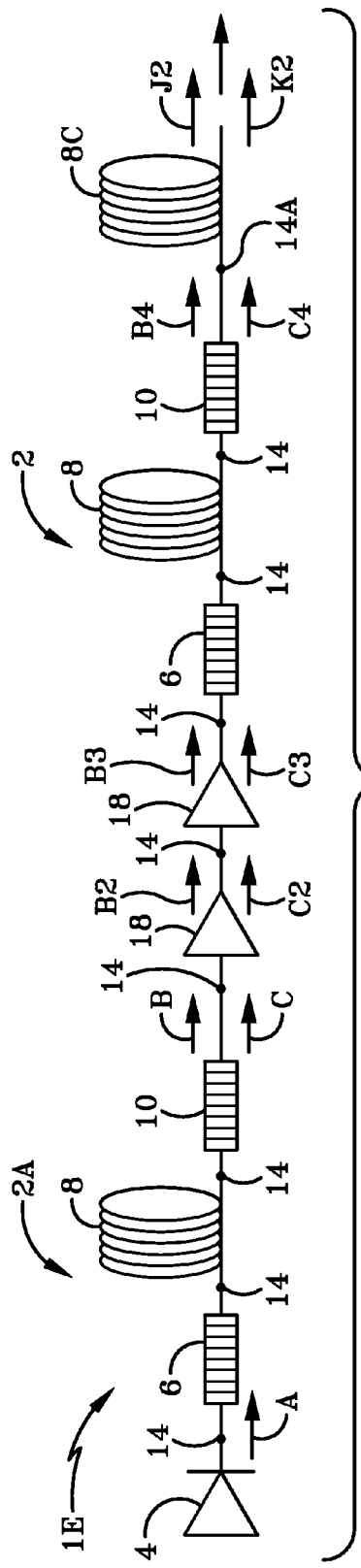

PUMP RECYCLING INTEGRATED AMPLIFIER

CROSS-REFERENCE TO RELATED APPLICATION

This application claims priority from U.S. Provisional Patent Application Ser. No. 62/058,826, filed Oct. 2, 2014, the disclosure of which is incorporated herein by reference.

BACKGROUND

Technical Field

The technical field may relate to lasers and more particularly to fiber laser oscillators.

Background Information

The design of fiber laser oscillators differ from solid state laser oscillators due to the losses associated with the long lengths of gain media. A gain medium of a fiber oscillator may be on the order of meters in length as opposed to solid state crystals that are commonly in the range of centimeters. With over a magnitude greater gain length in fiber oscillators, the intrinsic material losses and the energy dynamics of the rare earth dopant have prohibited the design of a fiber oscillator for maximum pump utilization. The fiber optic driven power losses are increased as one oscillates a frequency close to the border of the host material's spectral transparency. In silica-based fiber, this background power loss can become significant above a wavelength of 1.7 microns (1700 nanometers). In addition, three-level laser operation in a fiber can lead to significant ground-state absorption (e.g., erbium-doped fiber lasers emitting at 1532 nm or thulium-doped fiber lasers operating below 1940 nm), increasing laser threshold and leading to a loss in optical power in long lengths of fiber. These high losses inherently limit the efficiency of the laser, particularly in fiber lasers with long gain medium lengths on the order of several meters.

The output signal power of a laser is dependent on the available and absorbed pump power according to conservation of energy. Laser action is realized in a resonant cavity through absorption of pump power in a gain medium with subsequent conversion of the pump power to signal power emitted from the resonator output coupler. The total pump power absorbed by the laser and the ability of the medium (and associated rare earth ion dopant) to convert the pump power to signal power, all factors considered to be equal, are inexorably coupled. If one desires more signal power, without regard for lasing efficiency, the laser may be pumped at greater and greater levels.

The design of laser oscillators is generally predicated on maximum pump absorption to generate the greatest amount of power. This is achieved by increasing the length of the medium or the dopant concentration. The length of the fiber gain medium may be increased at the sacrifice of excess background and ground state absorption losses. Alteration of dopant concentration is a less available option in fiber optics due to coupling of fiber content with the optical properties of the fiber such as numerical aperture (NA), mode propagation, splice-ability, damage threshold and overall cost. The lasing efficiency of a solid state laser is tailored using mode matching and beam conditioning strategies. This is a design lever or option that is not available in fiber optics due to the nature of the confined waveguide.

The design parameters of a fiber laser from a solid state laser based upon similar output characteristics of the laser diverge due to the differences in performance characteristics described above. For instance, to improve fiber laser efficiency, one generally decreases the fiber length to minimize ground state absorption and background losses. Since the pump absorption is coupled with gain medium length, as one shortens the gain medium length, less power is absorbed, thus reducing the total output power of the laser. In contrast, the design of a fiber laser for maximum output power is achieved by increasing total fiber length for a given level of pump power. This generally results in decreased laser efficiency due to the fiber optic driven power losses. Most practical applications demand an optimized combination of highly efficient operation with the maximum power available from the laser. Thus, a need exists for a way to increase the efficiency of fiber lasers.

FIG. 1 generally shows a prior art laser system 1 which may comprise a fiber laser oscillator 2 which may comprise or be connected to an oscillator optical pump source which may include one or more optical pump sources 4. Pump source 4 may, for example, be in the form of a discharge lamp (arc lamp, flash lamp) or a pump diode. Oscillator 2 may include a high reflector or high reflector mirror 6 downstream of pump source 4, an oscillator or resonator length or piece of rare earth doped medium or optical fiber 8 downstream of mirror 6 and a partial reflector or partial reflector mirror 10 which is downstream of piece of fiber 8 and may serve as an oscillator output of oscillator 2. Mirror 6 may be a high reflector fiber Bragg grating, dielectric coating or other suitable high reflector known in the art. Mirror 10 may be a partial reflector fiber Bragg grating, dielectric coating or other suitable partial reflector known in the art. System 1 may further include a pump remover or cladding mode stripper 12 downstream of mirror 10.

The various components of system 1 and the laser systems discussed hereafter may be connected or spliced to or onto one another at respective splices, connections or connectors 14. Pump source 4 at a downstream end thereof may be connected or spliced to mirror 6 at an upstream end thereof at the given splice or connector 14. Mirror 6 at a downstream end thereof may be connected or spliced to fiber 8 at an upstream end thereof at the given splice or connector 14. Fiber piece 8 at a downstream end thereof may be connected or spliced to mirror 10 at an upstream end thereof at the given splice or connector 14. Mirror 10 at a downstream end thereof may be connected or spliced to pump remover 12 at an upstream end thereof at the given splice or connector 14.

As known in the art, pump source 4 may produce pump light which, as represented at Arrow A, exits pump source 4 and enters the optical cavity (a.k.a. resonant cavity or optical resonator) comprising high reflector 6, doped fiber 8 and partial reflector 10 to produce a laser which exits the output/reflector 10 of the optical cavity and oscillator 2 and enters pump remover/stripper 12, as shown at Arrow B. Unused or unabsorbed pump light, which was not absorbed in the gain medium or fiber 8 of the fiber laser oscillator, also moves downstream to exit the output/reflector 10 of the optical cavity/oscillator and enters pump remover/stripper 12, as shown at Arrow C, so that remover 12 removes or separates the unused pump light from the laser. The unused pump light is shown being removed, separated or exiting remover 12 at Arrow D. The laser continues downstream out of remover 12, as shown at Arrow E. The unused pump light thus represents pump energy which was not used in forming or enhancing the laser and is therefore wasted energy. Moreover, the laser produced does not benefit from the power which might have been attained if the unused pump energy could have been harnessed to enhance or amplify the laser.

By way of example, operating a thulium-doped fiber laser at 1900 nm is difficult due to bulk silica losses and ground-state absorption losses in the Tm-doped fiber. The fiber length required to achieve maximum output power from an oscillator may result in 20% unused pump power. Thus, for instance, for 100 watts (W) of pump power provided to the oscillator, 20 W is unused or not absorbed in the oscillator and thereby completely wasted.

FIG. 2 generally shows another prior art laser system 1A which may be or comprise a master oscillator power amplifier. System 1A is similar to system 1 in some ways and may include a fiber laser oscillator 2 as previously described, which thus may include high reflector mirror 6, doped fiber 8 and partial reflector mirror 10. System 1A may include pump remover or cladding mode stripper 12. System 1A may also include a pump combiner 16, one or more amplifier pump sources/diodes 4A and another rare earth doped medium or fiber 8A.

System 1A may operate in the same manner as discussed above with respect to system 1 to the extent that system 1A includes pump source 4, high reflector 6, fiber 8, partial reflector 10 and remover 12, as likewise shown by Arrows A-E. In addition, system 1A provides an amplifier which may include optical pump sources 4A, combiner 16 and downstream doped fiber 8A. As known in the art, the laser may exit pump remover 12 and move downstream to enter combiner 16 (Arrow E), and pump sources 4A may also produce pump light which moves downstream (Arrows F) into combiner 16. The laser and the pump light from pump sources 4A may exit combiner 16 and enter the second doped fiber 8A to create a more powerful laser H exiting fiber 8A compared to the laser shown at Arrow E. However, the unused pump light/energy removed (Arrow D) from the laser (Arrow E) by pump remover 12 is still wasted, as is the case with prior art laser system 1 previously discussed.

SUMMARY

In one aspect, a laser system may comprise a fiber laser oscillator; an amplifier piece of rare earth doped optical fiber downstream of and in optical communication with the oscillator; the amplifier piece of optical fiber adapted to absorb pump light which is unabsorbed in the oscillator; and an oscillator optical pump source which serves as an optical pump source for the oscillator and the amplifier piece of optical fiber; wherein the laser system does not include a pump remover which is downstream of the oscillator and upstream of the amplifier piece of optical fiber.

In another aspect, a laser system may comprise a fiber laser oscillator; an amplifier piece of rare earth doped optical fiber downstream of and in optical communication with the oscillator so that unused pump light which is unabsorbed in the oscillator is receivable by the amplifier piece of optical fiber, which is adapted to absorb the unused pump light; and an oscillator optical pump source which serves as an optical pump source for the oscillator and the amplifier piece of optical fiber; wherein the laser system does not include an additional optical pump source which serves as an optical pump source for the optical fiber without serving as an optical pump source for the oscillator.

In another aspect, a method may comprise the steps of providing a fiber laser oscillator and an amplifier piece of rare earth doped optical fiber downstream of the oscillator; pumping the oscillator with pump light so that the oscillator produces a laser which exits the oscillator and enters the amplifier piece of optical fiber and so that unused pump light which is unabsorbed in the oscillator exits the oscillator and enters the amplifier piece of optical fiber; and absorbing the unused pump light in the amplifier piece of optical fiber to amplify the laser in the amplifier piece of optical fiber.

BRIEF DESCRIPTION OF THE SEVERAL VIEWS OF THE DRAWINGS

One or more sample embodiments are set forth in the following description, shown in the drawings and particularly and distinctly pointed out and set forth in the appended claims.

FIG. 1 is a schematic view of a prior art laser system including a fiber laser oscillator.

FIG. 2 is a schematic view of a prior art laser system including a master oscillator power amplifier.

FIG. 3 is a schematic view of a laser system including a fiber laser oscillator and amplifier.

FIG. 4 is a schematic view of a laser system including an improved master oscillator power amplifier.

FIG. 5 is a schematic view of a laser system including an amplifier-pumped oscillator.

FIG. 6 is a schematic view of a laser system including an amplifier-pumped oscillator.

Similar numbers refer to similar parts throughout the drawings.

DETAILED DESCRIPTION

Before describing the various laser systems of FIGS. 3-6, it is first noted that each of the pieces (8, 8A, 8C) of rare earth doped optical fiber discussed herein may, for instance, be in the form of a piece of laser fiber which may be a single clad laser fiber, a double clad laser fiber or other laser fiber known in the art. Thus, each doped laser fiber piece may include a gain medium or core embedded within one or more cladding layers and an outer coating such as a polymer coating which coats the one or more cladding layers. The gain medium or core may be formed of or comprise one or more of a silica-based glass, a fluoride-based glass, a chalcogenide-based glass, a telluride-based glass, and an yttria-based glass which is doped with one or more of the rare earth elements ytterbium, neodymium, erbium, praseodymium, thulium and holmium.

FIG. 3 shows a laser system 1B which is configured to use the unused pump light which is unabsorbed in the oscillator as discussed above with respect to the prior art laser systems of FIGS. 1 and 2. Improved system 1B may be most easily compared directly to prior art laser system 1 of FIG. 1. Like system 1, laser system 1B may comprise a fiber laser oscillator 2 which may comprise or be connected to an oscillator optical pump source which may include one or more optical pump sources 4. Pump source 4 may, for example, be in the form of a discharge lamp (arc lamp, flash lamp) or a pump diode. Oscillator 2 may include a high reflector or high reflector mirror or cavity reflector 6 downstream of pump source 4, an oscillator or resonator length or piece of rare earth doped medium or optical fiber 8 downstream of mirror 6 and a partial reflector or partial reflector mirror or cavity reflector 10 which is downstream of piece of fiber 8 and may serve as an oscillator output of oscillator 2. Mirror 6 may be a high reflector fiber Bragg grating or other suitable high reflector known in the art. Mirror 10 may be a partial reflector fiber Bragg grating or other suitable partial reflector known in the art. System 1B may further include a pump remover or cladding mode stripper 12 downstream of mirror 10. However, system 1B also includes a piece of rare earth doped medium or optical fiber 8C which is downstream of oscillator 2/partial reflector 10 and upstream of stripper 12.

Thus, it may be that system 1B does not include—or may be free of—a remover/stripper (like remover/stripper 12) which is between oscillator 2/reflector/output 10 and piece of optical fiber 8C. Said another way, it may be that system 1B does not include—or may be free of—a remover/stripper (like remover/stripper 12) which is downstream of oscillator 2/reflector/output 10 and upstream of piece of optical fiber 8C. It may also be that system 1B does not include (or may be free of) a pump combiner or an optical pump source/light source (respectively like combiner 16 and optical pump sources 4A of FIGS. 2 and 4) which is between oscillator 2/reflector/output 10 and piece of optical fiber 8C (or which is downstream of oscillator 2/reflector/output 10 and upstream of piece of optical fiber 8C). It may also be that system 1B does not include—or may be free of—(1) an optical filter, (2) an optical isolator, or (3) a frequency feedback element (for example, a fiber Bragg grating or dielectric coating) which is between oscillator 2/reflector/output 10 and piece of optical fiber 8C (or which is downstream of oscillator 2/reflector/output 10 and upstream of piece of optical fiber 8C). It may also be that system 1B does not include—or may be free of—an optical pump source or light source which serves as an optical pump source for the amplifier piece of optical fiber 8C and which does not serve as an optical pump source for oscillator 2. This might also be stated that system 1B does not include—or may be free of—an optical pump source or light source which seeds the amplifier piece of optical fiber 8C and which does not seed oscillator 2. It may also be that system 1B does not include (or may be free of) other known laser-related components between oscillator 2/reflector/output 10 and piece of optical fiber 8C (or downstream of oscillator 2/reflector/output 10 and upstream of piece of optical fiber 8C), wherein such other known laser-related components may be known in the art but not listed specifically herein. Applicant hereby retains the right to claim non-inclusion of such laser-related components if necessary to define over prior art where such components may be listed in prior art documents cited against claims in the present case.

It will be understood that various components of any given laser system shown in the Figures may be upstream of or downstream of other components of the given laser system, and that in the present application, it is generally true that any component shown to the left of one or more components of a given laser system is upstream of said one or more components, and that any component shown to the right of one or more other components of a given laser system is downstream of said one or more other components. One exception to this rule may be the optical pump light sources 4A which are shown above and below the respective pump combiner 16 in FIGS. 2 and 4, in which case these optical pump light sources may be upstream of the respective combiner 16. Otherwise, light sources 4A may be understood to be, for example, downstream of the given pump remover 12 and upstream of the given fiber piece 8A, and to seed the given combiner 16 and fiber piece 8A.

It will also be understood that the various components of a given laser system discussed herein are in the optical communication with one another such that light or a laser may move or propagate (downstream) from one component of the given system to the other components of the given system. Thus, for instance, with respect to laser system 1B of FIG. 3, mirror 6 may be downstream of and in optical communication with pump source 4; oscillator piece 8 of oscillator/resonator 2 may be downstream of and in optical communication with mirror 6 and pump source 4; mirror 10 may be downstream of and in optical communication with piece 8 of oscillator/resonator 2, mirror 6 and pump source 4; amplifier piece 8C may be downstream of and in optical communication with mirror 10, piece 8 of oscillator/resonator 2, mirror 6 and pump source 4; and remover/stripper 12 may be downstream of and in optical communication with amplifier piece 8C, mirror 10, piece 8 of oscillator/resonator 2, mirror 6 and pump source 4.

In addition, the various components of a given laser system herein may be spliced or directly connected to those components of the given laser system shown directly upstream and/or directly downstream thereof at the given splice or connector 14 which is shown between the two components so spliced or directly connected. Thus, for instance, with respect to laser system 1B of FIG. 3, the splices or direct connections may be as follows. Pump source 4 at a downstream end thereof may be directly connected or spliced to mirror 6 at an upstream end thereof at the given splice or connector 14. Mirror 6 at a downstream end thereof may be directly connected or spliced to oscillator/resonator fiber piece 8 at an upstream end thereof at the given splice or connector 14. Fiber piece 8 at a downstream end thereof may be directly connected or spliced to mirror 10 at an upstream end thereof at the given splice or connector 14. Mirror 10 at a downstream end thereof may be directly connected or spliced to amplifier piece 8C at an upstream end thereof at the given splice or connector 14. Amplifier piece 8C at a downstream end thereof may be directly connected or spliced to pump remover 12 at an upstream end thereof at the given splice or connector 14.

Although amplifier piece 8C may be connected directly to the output/reflector 10 of oscillator 2 as noted above at splice or connector 14A, this may also be an indirect connection via inclusion of a piece of non-doped optical fiber (which may also be represented at 14A) between reflector 10 and piece 8C. More particularly, non-doped fiber 14A may be a piece of non-rare earth-doped optical fiber, that is, the fiber or core thereof is not doped with any rare earth element (i.e., ytterbium, neodymium, erbium, praseodymium, thulium and holmium). By way of example, an upstream end of the non-doped optical fiber piece 14A may be spliced or directly connected to a downstream end of oscillator 2 output and a downstream end of the non-doped optical fiber piece may be spliced or directly connected to an upstream end of amplifier piece 8C. Such a piece of non-doped optical fiber 14A may be positioned between reflector and piece 8C such that the piece of non-doped fiber 14A may, for example, have a core with a different core size than the core size of the core of oscillator fiber piece 8 or may have multiple claddings to provide brightness conversion. The non-doped fiber 14A or core thereof may be formed of or comprise one or more of a silica-based glass, a fluoride-based glass, a chalcogenide-based glass, a telluride-based glass, and an yttria-based glass. As will be understood, such a piece of non-doped optical fiber 14A may generally be kept to a minimum length for the given purpose to minimize any energy loss of the laser and unused pump light from oscillator 2 to amplifier piece 8C which may occur within the non-doped fiber piece 14A.

In operation, pump source 4 of system 1B may produce pump light which, as represented at Arrow A, exits pump source 4 and enters the optical resonator comprising high reflector 6, doped fiber piece 8 and partial reflector 10 to produce a laser (Arrow B) which exits the output/reflector 10 of the optical cavity/oscillator 2 and enters amplifier piece 8C and so that unused, leftover or unabsorbed pump light (Arrow C), which was not absorbed in the gain medium or fiber 8 of the fiber laser oscillator 2, exits partial reflector 10 and enters amplifier fiber piece 8C such that the unused or leftover pump light is absorbed in amplifier piece 8C to amplify or add power to the seed laser (Arrow B). Thus, the amplified laser (Arrow J) may exit piece 8C along with any unused pump light (Arrow K), which is minimal at this point, and enter pump remover/stripper 12, where any remaining unused pump light is removed or exits remover/stripper 12 at Arrow D. The amplified laser (Arrow L) exits remover/stripper 12 for whatever purpose amplified laser L is intended.

Thus, the amplified laser produced at Arrows J and L does benefit from the power which is extracted by amplifier doped fiber piece 8C from the unused pump light of oscillator 2 and which would otherwise have been wasted in the prior art system 1 of FIG. 1. It is noted that the laser (Arrow B) and unused pump light (Arrow C) exiting oscillator 2 may pass or move downstream directly into amplifier piece 8C via the splice or connection therebetween, or may pass or move downstream from the oscillator output into the non-doped piece of optical fiber 14A, where used, and from there into amplifier piece 8C. It may also be said that amplifier/gain fiber piece 8C absorbs the leftover pump light or power and is seeded by oscillator 2. The pump light or power may then be transferred in amplifier piece 8C to the seed signal, resulting in a higher output power of laser L as compared to laser E of prior art system 1 of FIG. 1 (given the same input power from oscillator pump source 4).

Amplifier piece 8C may absorb at least 20, 30, 40, 50, 60, 70, 80, 90 or 95 percent of the amount of the unused or leftover pump light/power which is unabsorbed in oscillator 2 so that the leftover pump light/power may be used to amplify the seed laser (Arrow B), thus producing the amplified laser (Arrows J, L). Thus, in comparison to the example given above with respect to system 1 of FIG. 1, laser system 1B may allow the majority (or at least 20, 30, 40, 50, 60, 70, 80, 90 or 95 percent) of the 20W of the unused or leftover pump light/power to be absorbed in amplifier piece 8C to amplify the seed laser.

As noted above, it may be that system 1B does not include (or is free of) a remover/stripper which is between oscillator 2/reflector/output 10 and piece of optical fiber 8C. System 1B may configured to that effect or in any manner understood by one skilled in the art to allow laser (Arrow B) and pump light (Arrow C) to exit and move downstream from the output (coupler)/reflector 10 of oscillator 2 into amplifier doped fiber piece 8C.

The basic concept of the use of amplifier fiber piece 8C discussed with respect to laser system 1B may also be used in many different contexts. A few of these contexts or laser systems 1C-1E are shown in FIGS. 4-6. It will be understood by one skilled in the art that the contexts/systems shown herein are examples which demonstrate but a few of the many possibilities for the use of this basic concept. Given the use of similar components and similar splicing or other connections between components within the various laser systems described herein (as will be evident from the Figures), the descriptions of laser systems 1C-1E may be more abbreviated to prevent unnecessary repetition. In short, the components in the following laser systems which are numbered the same and shown in the Figures to be connected in the same manner and to be upstream or downstream of one another as discussed with the previous laser systems will be understood to be the same (or same type of) components and connections and have the same relative locations upstream or downstream of one another. It will also be understood that the use of amplifier fiber piece 8C in systems 1C-1E may provide the same results or type of results as discussed with respect to system 1B and that systems 1C-1E may likewise be configured such that they do not include (or may be free of) various components as discussed above with respect to system 1B.

Laser system 1C represented in FIG. 4 may be understood as a particular improvement to the prior art laser system 1A of FIG. 2. System 1C may be or comprise an improved master oscillator power amplifier. Like system 1A, laser system 1C may comprise a fiber laser oscillator 2 which may comprise or be connected to an oscillator optical pump source or optical pump source(s) 4. Oscillator 2 may include high reflector 6, oscillator piece of rare earth doped optical fiber 8 and a partial reflector 10. System 1C may include amplifier doped fiber piece 8C downstream of reflector 10, and pump remover 12 downstream of mirror 10, a pump combiner 16 and amplifier pump source(s)/diode(s) 4A downstream of stripper 12 and a downstream piece of rare earth doped fiber 8A which is downstream of combiner 16. System 1C may thus have an amplifier downstream of pump remover 12 which may include pump combiner 16, pump source(s)/diode(s) 4A and doped fiber piece 8A. As with system 1B of FIG. 3, system 1C may include a non-doped fiber 14A between oscillator 2 and amplifier fiber piece 8C.

System 1C may operate in the same manner as discussed above with respect to system 1A of FIG. 2 at least to the extent that system 1C includes pump source 4, and oscillator 2 comprising high reflector 6, fiber 8, partial reflector 10, as likewise shown by Arrows A-C. However, instead of, as shown in prior art system 1A of FIG. 2, laser B and unused pump light C entering pump remover 12 so that laser E and unused pump light D exit pump remover before entering the downstream amplifier (4A, 16, 8A in FIG. 2), in system 1C, laser B and unused pump light C enter amplifier fiber piece 8C before entering pump remover 12. Fiber piece 8C thus absorbs unused pump light C to add power or amplify laser B to produce amplified laser J and greatly diminished remaining unused pump light K, which exit fiber piece 8C and then enter pump remover 12, which removes (Arrow D) the remaining unused pump light K (i.e. pump light which was not absorbed in fiber piece 8C) from the laser which moves downstream (Arrow M) into the amplifier pump combiner 16. Similar to system 1A, system 1C pump sources 4A may produce pump light which moves downstream (Arrows F) into combiner 16 so that the laser (Arrow P) and the pump light from pump sources 4A may exit combiner 16 and enter the second doped fiber 8A to create a more powerful laser Q exiting fiber 8A compared to the laser shown at Arrow H in prior art system 1A in FIG. 2, given the same input power from pump sources 4 and 4A. System 1C thus substantially reduces the waste of unused pump light/energy removed in comparison to system 1A.

Laser system 1D of FIG. 5 again includes pump source 4, oscillator 2 and amplifier fiber piece 8C. Pump source 4 may be or include a seed diode or semiconductor laser oscillator. However, system 1D illustrates amplification of the seed laser which enters oscillator 2 by use of one or more amplifiers 18. Thus, system 1D may include these one or more amplifiers 18 which are downstream of pump source/seed diode 4 and upstream of oscillator 2. Each amplifier 18 may include a pump combiner 16, pump source(s)/diode(s) 4A and a doped fiber piece 8A, such as discussed with respect to the amplifier downstream of pump remover 12 in laser systems 1A and 1C in FIGS. 2 and 4.

In operation, pump source/seed diode 4 of system 1D may produce pump light and a laser (represented jointly by Arrow A here) which exit source 4 and enter the upstream amplifier 18, which increases the power of or amplifies the laser. The amplified laser and any unused pump light (represented jointly by Arrow A1) exit the upstream amplifier 18 and enter the next or downstream amplifier 18, which again increases the power of or amplifies the laser. The additionally amplified laser and any unused pump light (represented jointly by Arrow A2) exit the second or downstream amplifier 18 and enter oscillator 2, thus providing the seed laser for oscillator 2. Oscillator 2 uses the seed laser and pump light A2 and produces laser B1 and unused pump light C1, which exits oscillator 2 and enters amplifier fiber piece 8C (via non-doped fiber piece 14A where used), whereby piece 8C absorbs the unused pump light and amplifies the laser as previously discussed, thus producing amplified laser J1 and substantially reduced remaining unused/unabsorbed pump light K1.

Laser system 1E of FIG. 6 is similar to laser system 1D of FIG. 5 in that system 1E also provides one or more amplifiers 18 upstream of primary oscillator 2 and amplifier fiber piece 8C to provide a seed laser to oscillator 2. System 1E also includes a secondary or additional oscillator 2A which is downstream of pump source 4 and upstream of the one or more amplifiers 18. Oscillator 2A may have the same or essentially the same configuration as oscillator 2. Each amplifier 18 may be configured as noted above with respect to system 1D.

In operation, pump source 4 of system 1E may produce pump light (Arrow A) which exits source 4 and enters the upstream oscillator 2A, which produces laser B, which exits oscillator 2A along with unused/unabsorbed pump light C and enters the upstream amplifier 18, which increases the power of or amplifies the laser B, whereby the initially amplified laser (Arrow B2) and remaining unused/unabsorbed pump light (Arrow C2) exits the upstream amplifier 18. This initially amplified laser B2 and remaining unused/unabsorbed pump light C2 then enters the downstream amplifier 18, which increases the power of or additionally amplifies the initially amplified laser B2, whereby the additionally amplified laser B3 and remaining unused/unabsorbed pump light C3 exits the downstream amplifier 18 and enters oscillator 2. Laser B2 thus serves as a seed laser for oscillator 2, which produces laser B4, which exits oscillator 2 along with unused/unabsorbed pump light C4 so that laser B4 and pump light C4 enter amplifier fiber piece 8C (via non-doped fiber piece 14A where used), whereby piece 8C absorbs the unused pump light C4 and amplifies the laser as previously discussed, thus producing amplified laser J2 and substantially reduced remaining unused/unabsorbed pump light K2.

In reviewing the various examples discussed above, it can be seen that the fiber oscillator 2 of systems 1B-1E may convert a portion of the absorbed pump energy into signal energy and then pass the remaining pump energy out past the output coupler (fiber grating, external mirror, etc) so that amplifier fiber piece 8C is capable of absorbing that unused pump energy and constructively converting it into usable signal energy. This may be particularly useful when designing lasers with output parameters that are not conducive to the efficient use of pump energy. Such an application is the reduction of pulse width in a gain switched oscillator. When pulsing a laser system, it is most often desirable to achieve the shortest pulse width possible. There is a severe compromise between output power and pulse width in a fiber optic gain switched oscillator due to the coupled relationship between doped fiber length, the oscillator efficiency, and the pulse width and associated temporal properties. The use of amplifier piece 8C as detailed above allows for the generation of a significantly higher energy/peak power pulse in a gain switched oscillator. The use of amplifier piece 8C may counter the sacrifice in the absorbed pump power, and the total power output, for a short-pulse-gain-switched-oscillator with relatively short doped fiber pieces/lengths which absorb the pump power unused in the oscillator. The pump power absorbed in the amplifier piece 8C may then be extracted by the oscillator pulse. The use of amplifier piece 8C may thus decouple the absorption, emission and temporal properties of a short-pulse-gain-switched-oscillator from oscillator fiber length.

The use of amplifier piece 8C may also be utilized in oscillator architectures where spectral properties of the laser require low modal content or high spectral density. The primary limit in achieving high spectral density in a laser oscillator is the spectral bandwidth of the frequency tuning optics. For a fiber laser, Fiber Bragg Gratings (FBG's) are commonly used to narrow the emission bandwidth of a laser. Coupled with the oscillator feedback elements is the free spectral range associated with the cavity of the oscillator. The total number of modes is the number of axial modes present with the acceptance bandwidth of the oscillator feedback elements. The free spectral range of an oscillator depends on cavity length and will decrease with increasing oscillator length. To reduce the total number of modes in a cavity, it is generally desirable to decrease the total oscillator cavity length while constraining spectral feedback as much as physically possible. This is counter-productive with respect to laser efficiency in a fiber laser due to the coupled nature of pump absorption and gain with fiber length. Therefore a reduction in total number of axial modes is coupled with inherently poor efficiency in prior art systems. The use of amplifier piece 8C may increase the overall efficiency of an oscillator operating with few axial modes by decoupling the spectral characteristics of the laser from absorption and emission properties resulting from short oscillator fiber lengths. The use of doped fiber piece 8C may allow for the design of a fiber laser based on maximum (or high) efficiency, which will also result in maximum (or high) output power, without significant redesign of the doped fiber piece itself (i.e. without having to change the fiber doping concentrations) or the fundamental laser architecture.

It is noted that various components or terms having the same names described herein may be denoted as additional or other components, or first, second, third and fourth components, etc. For instance, various pump sources may be denoted as an additional pump source or another pump source or first, second, third, fourth, (etc) pump sources, and so forth. Other such components may include, without limitation, oscillators, high reflectors, partial reflectors, doped fiber pieces, amplifiers, splices, connectors and so forth. Similarly, various similar components may be referred to as an upstream component or downstream component where applicable.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustration set out herein are an example not limited to the exact details shown or described.

The invention claimed is:

1. A laser system comprising:
   a fiber laser oscillator;
   an amplifier piece of rare earth doped optical fiber downstream of and in optical communication with the oscillator; the amplifier piece of optical fiber adapted to absorb pump light which is unabsorbed in the oscillator; and
   an oscillator optical pump source which serves as an optical pump source for the oscillator and the amplifier piece of optical fiber;
   wherein the laser system does not include a pump remover which is downstream of the oscillator and upstream of the amplifier piece of optical fiber;
   wherein the laser system does not include an additional optical pump source which serves as an optical pump source for the optical fiber without serving as an optical pump source for the oscillator.

2. The laser system of claim 1 wherein the amplifier piece of optical fiber is spliced onto an output of the oscillator.

3. The laser system of claim 1 wherein the laser system does not include a pump combiner which is downstream of the oscillator and upstream of the amplifier piece of optical fiber.

4. The laser system of claim 1 wherein the laser system does not include an optical filter which is downstream of the oscillator and upstream of the amplifier piece of optical fiber.

5. The laser system of claim 1 wherein the laser system does not include an optical isolator which is downstream of the oscillator and upstream of the amplifier piece of optical fiber.

6. The laser system of claim 1 wherein the laser system does not include a frequency feedback element which is downstream of the oscillator and upstream of the amplifier piece of optical fiber.

7. The laser system of claim 1 wherein the laser system does not include a fiber Bragg grating which is downstream of the oscillator and upstream of the amplifier piece of optical fiber.

8. The laser system of claim 1 wherein the laser system does not include a dielectric coating which is downstream of the oscillator and upstream of the amplifier piece of optical fiber.

9. The laser system of claim 1 further comprising a non-rare earth-doped piece of optical fiber which is downstream of the oscillator and upstream of the amplifier piece of optical fiber.

* * * * *